(12) United States Patent
Paolini, Jr. et al.

(10) Patent No.: US 8,576,470 B2
(45) Date of Patent: Nov. 5, 2013

(54) ELECTRO-OPTIC DISPLAYS, AND COLOR ALTERS FOR USE THEREIN

(75) Inventors: Richard J. Paolini, Jr., Framingham, MA (US); Jay William Anseth, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 13/151,312

(22) Filed: Jun. 2, 2011

(65) Prior Publication Data

US 2012/0075687 A1 Mar. 29, 2012

Related U.S. Application Data

(60) Provisional application No. 61/350,637, filed on Jun. 2, 2010.

(51) Int. Cl.
*G02B 26/00* (2006.01)
*G02F 1/29* (2006.01)

(52) U.S. Cl.
USPC .......................................... 359/238; 359/315

(58) Field of Classification Search
USPC ......... 359/238, 296, 245, 247, 251–252, 254, 359/108, 237, 278–279, 290–292, 298, 359/300–302, 259, 315–316, 276, 242; 345/49, 105, 107; 349/33, 38, 349/182–186; 348/84
See application file for complete search history.

(56) References Cited

U.S. PATENT DOCUMENTS

| | | | |
|---|---|---|---|
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,097,531 A | 8/2000 | Sheridon | |
| 6,128,124 A | 10/2000 | Silverman | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,184,856 B1 | 2/2001 | Gordon, II et al. | |
| 6,225,971 B1 | 5/2001 | Gordon, II et al. | |
| 6,241,921 B1 | 6/2001 | Jacobson et al. | |

(Continued)

FOREIGN PATENT DOCUMENTS

KR 20070069783 7/2007

OTHER PUBLICATIONS

Bach, U., et al., "Nanomaterials-Based Electrochromics for Paper-Quality Displays", Adv. Mater, 14(11), 845 (2002).

(Continued)

*Primary Examiner* — Dawayne A Pinkney
(74) *Attorney, Agent, or Firm* — David J. Cole

(57) ABSTRACT

An electro-optic display having a color filter array is produced by attaching together a direct thermal imaging layer (112) and a backplane (102) having a two-dimensional array of pixel electrodes. The direct thermal imaging layer (112) is then exposed to temperatures sufficient to form a plurality of differently colored areas in the direct thermal imaging layer, the plurality of differently colored areas being aligned with the two-dimensional array of pixel electrodes.

22 Claims, 3 Drawing Sheets

(56) References Cited

U.S. PATENT DOCUMENTS

| | | |
|---|---|---|
| 6,271,823 B1 | 8/2001 | Gordon, II et al. |
| 6,301,038 B1 | 10/2001 | Fitzmaurice et al. |
| 6,664,944 B1 | 12/2003 | Albert et al. |
| 6,672,921 B1 | 1/2004 | Liang et al. |
| 6,788,449 B2 | 9/2004 | Liang et al. |
| 6,864,875 B2 | 3/2005 | Drzaic et al. |
| 6,866,760 B2 | 3/2005 | Paolini Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,075,502 B1 | 7/2006 | Drzaic et al. |
| 7,086,795 B2 | 8/2006 | Burdenko |
| 7,116,318 B2 | 10/2006 | Amundson et al. |
| 7,166,558 B2 | 1/2007 | Bhatt et al. |
| 7,167,155 B1 | 1/2007 | Albert et al. |
| 7,170,670 B2 | 1/2007 | Webber |
| 7,176,161 B2 | 2/2007 | Chu et al. |
| 7,177,067 B1 | 2/2007 | Sakamoto |
| 7,220,868 B2 | 5/2007 | Cheon et al. |
| 7,236,291 B2 | 6/2007 | Kaga et al. |
| 7,259,744 B2 | 8/2007 | Arango et al. |
| 7,279,264 B2 | 10/2007 | Cheon et al. |
| 7,282,317 B2 | 10/2007 | Allen et al. |
| 7,312,784 B2 | 12/2007 | Baucom et al. |
| 7,321,459 B2 | 1/2008 | Masuda et al. |
| 7,328,980 B2 | 2/2008 | Saquib et al. |
| 7,339,715 B2 | 3/2008 | Webber et al. |
| 7,388,686 B2 | 6/2008 | Saquib et al. |
| 7,391,427 B2 | 6/2008 | LeBlanc |
| 7,408,563 B2 | 8/2008 | Busch et al. |
| 7,411,719 B2 | 8/2008 | Paolini, Jr. et al. |
| 7,416,267 B2 | 8/2008 | Puri |
| 7,420,549 B2 | 9/2008 | Jacobson et al. |
| 7,453,445 B2 | 11/2008 | Amundson |
| 7,504,360 B2 | 3/2009 | Chu et al. |
| 7,535,624 B2 | 5/2009 | Amundson et al. |
| 7,561,324 B2 | 7/2009 | Duthaler et al. |
| 7,635,660 B2 | 12/2009 | Bhatt et al. |
| 7,667,684 B2 | 2/2010 | Jacobson et al. |
| 7,679,814 B2 | 3/2010 | Paolini et al. |
| 7,704,667 B2 | 4/2010 | Cheon et al. |
| 7,791,789 B2 | 9/2010 | Albert et al. |
| 7,839,564 B2 | 11/2010 | Whitesides et al. |
| 7,910,175 B2 | 3/2011 | Webber et al. |
| 7,952,790 B2 | 5/2011 | Honeyman et al. |
| 7,956,841 B2 | 6/2011 | Albert et al. |
| 8,009,348 B2 | 8/2011 | Zehner et al. |
| 8,054,526 B2 | 11/2011 | Bouchard |
| 8,098,418 B2 | 1/2012 | Paolini et al. |
| 8,319,759 B2 | 11/2012 | Jacobson et al. |
| 2004/0180284 A1 | 9/2004 | Bhatt et al. |
| 2004/0263947 A1 | 12/2004 | Drzaic et al. |
| 2007/0223079 A1* | 9/2007 | Honeyman et al. ............ 359/296 |
| 2008/0043318 A1 | 2/2008 | Whitesides et al. |
| 2008/0048970 A1 | 2/2008 | Drzaic et al. |
| 2009/0004442 A1 | 1/2009 | Danner |
| 2009/0225398 A1 | 9/2009 | Duthaler et al. |
| 2010/0103502 A1 | 4/2010 | Jacobson et al. |
| 2010/0156780 A1 | 6/2010 | Jacobson et al. |
| 2011/0149376 A1* | 6/2011 | Mabeck et al. ............... 359/296 |

OTHER PUBLICATIONS

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Hayes, R.A., et al., "Video-Speed Electronic Paper Based on Electrowetting", Nature, vol. 425, Sep. 25, pp. 383-385 (2003).

* cited by examiner

ELECTRO-OPTIC DISPLAYS, AND COLOR ALTERS FOR USE THEREIN

REFERENCE TO RELATED APPLICATIONS

This application claims benefit of copending Provisional Application Ser. No. 61/350,637, filed Jun. 2, 2010.

This application is also related to:
(a) U.S. Pat. No. 7,667,684;
(b) U.S. Pat. No. 6,864,875;
(c) U.S. Pat. No. 7,075,502; and
(d) U.S. Patent Application Publication No. 2010/0225995 (now U.S. Pat. No, 8,098,418).

The entire contents of these copending application and these patents, and of all other U.S. patents and published and copending applications mentioned below, are herein incorporated by reference.

BACKGROUND OF INVENTION

This invention relates to electro-optic displays and color filters for use in such displays. More specifically, this invention relates to a method for producing such color filters which simplifies aligning the filter with the pixels of the electro-optic display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

Several types of electro-optic displays are known. One type of electro-optic display is a rotating bichromal member type as described, for example, in U.S. Pat. Nos. 5,808,783; 5,777, 782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870, 657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT)

and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. Nos. 6,017,584; 6,664,944; 6,864,875; 7,075,502; 7,167,155; 7,667,684; and 7,791,789; and U.S. Patent Applications Publication Nos. 2004/0263947; 2007/0109219; 2007/0223079; 2008/0023332; 2008/0043318; 2008/0048970; 2008/0211764; 2009/0004442; 2009/0225398; 2009/0237776; 2010/0103502; 2010/0156780; and 2010/0225995;

(f) Methods for driving displays; see for example U.S. Pat. Nos. 7,012,600; and 7,453,445;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Pat. No. 7,339,715); and other similar techniques.) Thus, the resulting display can be flexible. Further, because the display medium can be printed (using a variety of methods), the display itself can be made inexpensively.

Other types of electro-optic media may also be useful in the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982, 178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Many types of electro-optic media are essentially monochrome, in the sense that any given medium has two extreme optical states and a range of gray levels lying between the two extreme optical states. As already indicated, the two extreme optical states need not be black and white. For example, one extreme optical state can be white and the other dark blue, so that the intermediate gray levels will be varying shades of blue, or one extreme optical state can be red and the other blue, so that the intermediate gray levels will be varying shades of purple.

There is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another. Using a color filter array enables a single black/white electro-optic medium to provide a full color display (thereby avoiding the need to develop three different electro-optic media displaying the colors needed in a full color display), and it is typically easier to control the color gamut of a display by varying the colors in a color filter array than by varying the colors of electro-optic media, there being far more materials available for use in color filter arrays than in most electro-optic media.

However, attaching a color filter to an electro-optic display in the correction position is a difficult operation. Many color filter arrays are formed on sheets of glass or similar rigid material in order that the color filter will maintain stable dimensions (even slight distortions of the dimensions of a color filter array can lead to at least part of the color filter array being misaligned with the pixels of the display, with consequent errors in the colors displayed to an observer). For similar reasons, most backplanes used in color electro-optic displays are formed of rigid materials. The electro-optic medium is secured to one of the rigid sheets, and then the two rigid sheets are laminated together, typically with a layer of a polyurethane or other lamination adhesive between them, to form the final display. Traditionally, alignment marks are provided on the backplane and on the color filter array, these marks normally being disposed outside the active area of the display. With a rigid backplane and a rigid color filter array, correct alignment of the alignment marks will ensure correct alignment of the color filter array with the backplane. However, the difficulties in alignment are exacerbated in flexible displays; when the display is not rigid, even if the alignment marks on one portion of the display are correctly aligned, this does not guarantee correct alignment over the whole backplane and color filter array, since the color filter array can flex and become deformed.

Attempts have been made to overcome this problem by forming a color filter array on the display in alignment with the backplane of the display, rather than attempting to attach a pre-formed color filter array to the remaining components of the display. However, the resolution and alignment requirements imposed on such color filter formation processes are difficult to meet with most color filter formation technologies. A color filter array have a resolution of 100 lines per inch will (if formed using parallel bands of three different colors) require the production of stripes only $\frac{1}{300}$ inch (about 0.08 mm) wide, and producing such narrow stripes with no gaps between them and no overlap over the full width of a display several inches wide, and in accurate alignment with the pixels of a backplane present formidable challenges. High resolution photolithography can achieve the necessary resolution and alignment, but three separate passes are required and the method is costly and time-consuming. Attempts have been made to use ink jet printing or thermal transfer printing but no commercial products using these technologies have so far appeared. Any color-forming technology, such as thermal transfer printing, which requires a separate pass for each color, will face difficulties in achieving the high degree of alignment needed between the multiple passes. Furthermore, any technology which involves transfer of colored material to the front surface of an otherwise complete display may present problems with regard to the mechanical properties of the exposed viewing surface of the display. Since the surface upon which the colored material is deposited may form (unless a separate cover layer is later attached) an external surface of the display, it is necessary that this material be both an appropriate material for reception of the colored material, and have the mechanical properties (for example, abrasion and scratch resistance) required in an external surface, and it may be difficult to find a material with the necessary combination of properties. Alternatively, if a separate cover layer is to be superposed over the deposited colored material (a step which necessarily increases both the cost and the complexity of the display assembly process), it is necessary to ensure that the attachment of the cover layer does not damage or distort the underlying color filter.

Accordingly, there is a need for a process for the formation of color filter arrays in electro-optic displays which eliminates, or at least reduces, the aforementioned problems, and the present invention seeks to provide such a process.

SUMMARY OF THE INVENTION

This invention is based upon the realization that very satisfactory formation of color filter arrays in electro-optic displays, including flexible displays, can be effected using direct thermal imaging. Direct thermal imaging involves the use of a multilayer stack of materials in each layer capable of switching from clear to a color, typically one layer to cyan, one to magenta and another to yellow, when exposed to the proper temperature and duration of temperature. The methods for the creation of these materials, and apparatus for imaging such materials, are described in U.S. Pat. Nos. 7,086,795; 7,166,558; 7,176,161; 7,220,868; 7,279,264; 7,282,317; 7,328,980; 7,388,686; 7,391,427; 7,408,563; 7,416,267; 7,504,360; 7,635,660; and 7,704,667, all assigned to Zink Imaging, LLC of Waltham, Mass.

This invention provides a process for assembling a producing an electro-optic display having a color filter array, which process comprises:

providing an electro-optic display comprising a direct thermal imaging layer and a backplane having a two-dimensional array of pixel electrodes; and exposing the direct thermal imaging layer to temperatures sufficient to form a plurality of differently colored areas in the direct thermal imaging layer, the plurality of differently colored areas being aligned with the two-dimensional array of pixel electrodes.

This process may further comprise detecting at least one feature of the backplane; and aligning the plurality of differently colored areas with respect to this feature of the backplane. The detected feature of the backplane may be a fiducial mark provided especially for this purpose but could also be a functional feature of the backplane. For example, active matrix backplanes are provided with a plurality of row electrodes and a plurality of column electrodes, and the detected features of the backplane used for aligning the colored areas of the color filter could be one or more row electrodes and/or one or more column electrodes.

In the process of the invention, the display may further comprise a layer of a solid electro-optic medium. The position of the direct thermal imaging layer relative to the other components of the display can vary. For example, when the electro-optic display has a viewing surface on the opposed side of the layer of electro-optic material from the backplane, the direct thermal imaging layer may be disposed between the layer of electro-optic material and the viewing surface (this arrangement may hereinafter be called a "front direct thermal imaging layer"). However, it is also possible to use a "rear direct thermal imaging layer" which is on the opposed side of the layer of electro-optic material from the viewing surface. For example, the direct thermal imaging layer may be disposed between the layer of electro-optic material and the backplane, or may be disposed on the opposed side of the backplane from the layer of electro-optic material. In both types of rear direct thermal imaging layer, the plurality of differently colored areas may be formed in the direct thermal imaging layer before the layer of electro-optic material is affixed to the direct thermal imaging layer.

The displays of the present invention may make use of any of the types of electro-optic material discussed above. Thus, the electro-optic material used in the present displays may be, for example a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells, or may be present as a plurality of discrete droplets surrounded by a continuous phase comprising a polymeric material. The fluid may be liquid or gaseous.

This invention also provides an electro-optic display comprising:
 an electro-optic layer;
 a backplane having a two-dimensional array of pixel electrodes arranged to apply an electric field to the electro-optic layer; and
 a direct thermal imaging layer capable, upon exposure to elevated temperatures, of forming areas having at least two differing colors.

This invention also provides a front plane laminate comprising a direct thermal imaging layer capable, upon exposure to elevated temperatures, of forming areas having at least two differing colors, an electrically-conductive layer, an electro-optic layer and an adhesive layer disposed on the opposed side of the electro-optic layer from the electrically-conductive layer. The front plane laminate may further comprise a release sheet covering the surface of the adhesive layer remote from the electro-optic layer; this release sheet is of course removed before the front plane laminate is laminated to a backplane.

Finally, this invention provides a component useful for the production of an electro-optic display, the component comprising a layer of a solid electro-optic material, and a direct thermal imaging layer capable, upon exposure to elevated temperatures, of forming areas having at least two differing colors, the direct thermal imaging layer being affixed to the layer of solid electro-optic material.

DETAILED DESCRIPTION

Figure 1:
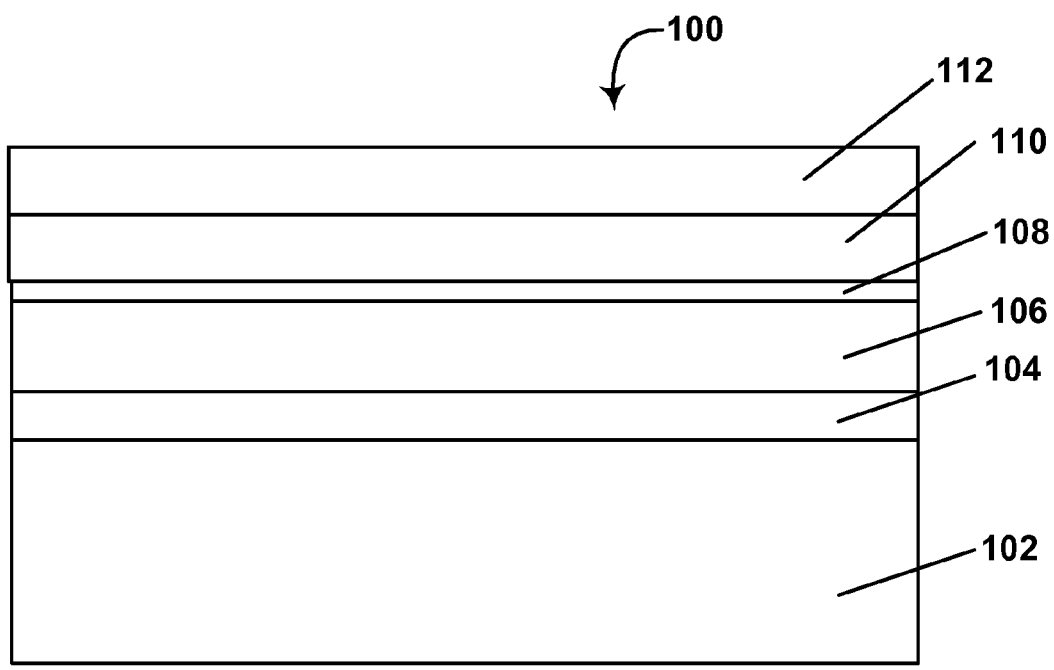
FIG. 1 of the accompanying drawings is a schematic cross-section through a first electrophoretic display of the present invention.

As already mentioned, the present invention provides a process for producing an electro-optic display having a color filter array. In this process, an electro-optic display is formed having a direct thermal imaging layer and a backplane having a two-dimensional array of pixel electrodes. The direct thermal imaging layer is then exposed to temperatures sufficient to form a plurality of differently colored areas in the direct thermal imaging layer, the plurality of differently colored areas being aligned with the two-dimensional array of pixel electrodes. The necessary alignment may be effected by detecting one or more features of the backplane, these features being either fiducial marks provided specifically for this purpose, or functional features, for example, row and column electrodes, already present in the backplane for other purposes. Thus, the present invention provides a simple, one step process for the creation of a color filter array on an otherwise completed display.

The direct thermal imaging technology described in the Zink patents mentioned above was developed to generate full color photographic images, with the multilayer stack of colored layers placed on top of white photographic paper. When used to form a color filter array (CFA) the multilayer stack of clear to color-developing materials comprising the direct thermal imaging layer may be coated on top of a clear substrate. There are multiple ways to accomplish this end.

Although it is common practice to provide a color filter array between the electro-optic medium and the viewing surface of the display (a front color filter array), it is also possible to use a rear color filter array, which is positioned on the opposed side of the electro-optic layer from the viewing surface of the display. Obviously, a display using a rear color filter array must also use an electro-optic medium which has a light transmissive mode to enable light entering the viewing surface of the display to reach the color filter. However, a rear color filter can improve the white state of a display. In a display using a front color filter array, since the light always passes through the color filter, the brightest state of the display available is to set the entire area of the electro-optic medium to its white (or brightest) state, so that (in the case of a conventional red/green/blue color filter array), the red, green and blue light reflected from the various sub-pixels will blend to form a "process white". This state of the display, however, still results about two-thirds of the light entering the viewing surface being absorbed by the color filter. In contrast, if a rear color filter array is used, in the white state of the display the entire display area can be turned white, so that substantially all of the light entering the viewing surface can be reflected back through the viewing surface without passing through the color filter. Hence, a much brighter white state of the display can be achieved with a rear color filter array. Various types of electro-optic material are known which are capable of displaying two colors and a light-transmissive state; see for example U.S. Pat. No. 7,259,744.

When a rear color filter array is employed, the array may be disposed either in front or behind the backplane, i.e., the array may be disposed between the backplane and the electro-optic material, or on the opposed side of the backplane from the electro-optic material. An array in front of the backplane lies between the electrodes of the display, and hence it is necessary to take account of the electrical properties of the array. On the other hand, if the array is disposed behind the backplane, the electrical properties of the array are irrelevant but the light must pass through the backplane twice and hence it is necessary to make the backplane as light-transmissive as possible. It will be appreciated that with either type of rear color filter array, it is necessary to provide some type of reflector behind the color filter array so that light passing through the electro-optic medium and the color filter array can be reflected back to the viewing surface. Such a reflector is not always necessary in the case of a front color filter array, in which the electro-optic medium may itself provide the necessary reflection.

For reasons already discussed, the electro-optic display of the present invention may be formed by laminating a front plane laminate (with the release layer removed) to a backplane, and when the display is to be formed in this manner, it is convenient to provide the direct thermal imaging layer on the front plane laminate (FPL) itself. This FPL may be a "classic" FPL as described in U.S. Pat. No. 6,982,178, in which case, the direct thermal imaging layer is conveniently coated directly on to the front substrate side of the FPL in a roll-to-roll process prior to the cutting out of parts sized to form individual displays, and prior to lamination of the FPL to a backplane. The direct thermal imaging layer remains unaddressed (uncolored) until after lamination of the FPL to the backplane. The FPL is then cut to the correct part size and laminated to an appropriate backplane. After lamination, the essentially complete display may be placed in a thermal imaging device to address the direct thermal imaging layer at high resolution and in alignment to the pixels of the backplane of the display. It will be appreciated that the imaging apparatus described in the aforementioned Zink patents will need to be modified to handle electro-optic displays and effect the necessary alignment of the colored areas with the backplane, but such modification is well within the skill of the imaging art.

In the case of a rear color filter array, it may be convenient to form the array before the electro-optic material is in place; although the color filter array has to be aligned with the backplane, no "alignment" of the electro-optic material is needed, since obviously the electro-optic material responds uniformly to the pixel electrodes of the backplane. Furthermore, forming a rear color filter array before the electro-optic material is affixed to the backplane avoids exposing the electro-optic material to the heat needed to form the color filter array, and avoids any possible interference by the electro-optic material with the temperature/time relationships needed for proper color development of the color filter elements. If it is desired to form a rear color filter with the electro-optic material in place (for example, when the direct thermal imaging layer forms part of an FPL), it may be desirable to use radiation to develop heat within the direct thermal imaging layer; if necessary, the direct thermal imaging layer can be provided with a radiation absorber to facilitate the conversion of radiation to heat within the layer. If radiation is to be used in this manner, it may be advantageous to use the electro-optic material as a shutter to expose the correct areas of the backplane to the radiation. For example, one could set the sub-pixels of the electro-optic material which, in the final display, are to be red sub-pixels to their light-transmissive state, leaving the other sub-pixels reflective, and expose the display to a uniform illumination so that heat is generated in the direct thermal imaging layer only in the areas where a red color is desired, then repeat the process for the green and blue sub-pixels.

FIG. 1 is a schematic cross-section through a display (generally designated 100) prepared using an FPL. The display 100 comprises a backplane 102 comprising a two-dimensional matrix of pixel electrodes (not shown), a layer of lamination adhesive 104, an electrophoretic layer 106, a front electrode layer 108, a front substrate 110 and a direct thermal imaging layer 112.

Alternatively, the direct thermal imaging layer could be coated on to a separate substrate, rather than on to an FPL. The substrate coated with the direct thermal imaging layer could then be laminated to the other layers needed to form the display, this lamination being effected at any one of several stages in the production of such a display. For example, the direct thermal imaging layer/substrate sub-assembly could be laminated to the front substrate of a classic FPL in a roll-to-roll process. Alternatively, if it is desired to produce the display using an inverted FPL as described in U.S. Pat. No. 7,259,744, or a double release film as described on U.S. Pat. No. 7,561,324, the inverted FPL or double release film can first be laminated to the direct thermal imaging layer/substrate sub-assembly, and then the resultant sub-assembly laminated to the backplane, either before or after severing the sub-assembly into pieces sized to produce individual displays. Alternatively, both the direct thermal imaging layer/substrate sub-assembly, and the FPL, inverted FPL or double release film could first be cut into pieces sized to produce individual displays, and laminated to each other, either before or after the FPL, inverted FPL or double release film is laminated to the backplane. However, in all cases, formation of a CFA in the direct thermal imaging layer should only occur after the direct thermal imaging layer is fixed relative to the backplane, in order that features of the backplane can be used to accurately align the CFA with the pixel electrodes of the backplane.

Figure 2:
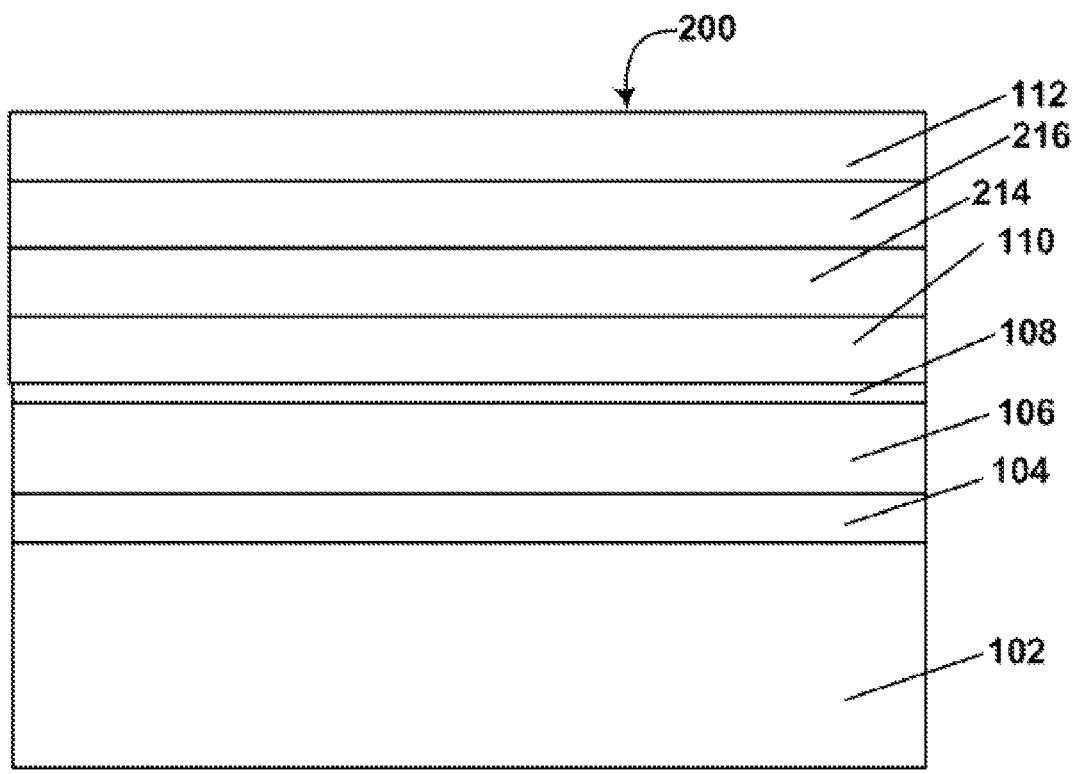
FIG. 2 is a schematic cross-section, similar to that of FIG. 1, through a second electrophoretic display of the present invention produced from a direct thermal imaging layer originally coated on a separate substrate.

FIG. 2 is a schematic cross-section, similar to that of FIG. 1, through a display (generally designated 200) produced using a direct thermal imaging layer originally coated on a separate substrate. The display 200 comprises a backplane 102 comprising a two-dimensional matrix of pixel electrodes (not shown), a layer of lamination adhesive 104, an electrophoretic layer 106, a front electrode layer 108 and a front substrate 110 all of which are identical to the corresponding layers in FIG. 1. However, the front substrate 110 is in contact with an adhesive layer 214, which is itself surmounted by a carrier substrate 216, which carries the direct thermal imaging layer 112.

The display 200 is produced by first coating the direct thermal imaging layer 112 on to the carrier substrate 216. Next, the adhesive layer 214 is coated on to the opposed surface of the substrate 216. (The order of these two coatings could of course be reversed.) The direct thermal imaging layer/substrate/adhesive layer sub-assembly thus produced is then laminated, conveniently in a roll-to-roll process, to an FPL comprising the layers 110, 108, 106 and 104, together with a release sheet (not shown) covering the surface of the adhesive layer 104 remote from the electrophoretic layer 106. The combined FPL thus produced can then have its release sheet removed and be laminated to a backplane to produce the final display, ready for formation of a color filter in the direct thermal imaging layer 112.

Figure 3:
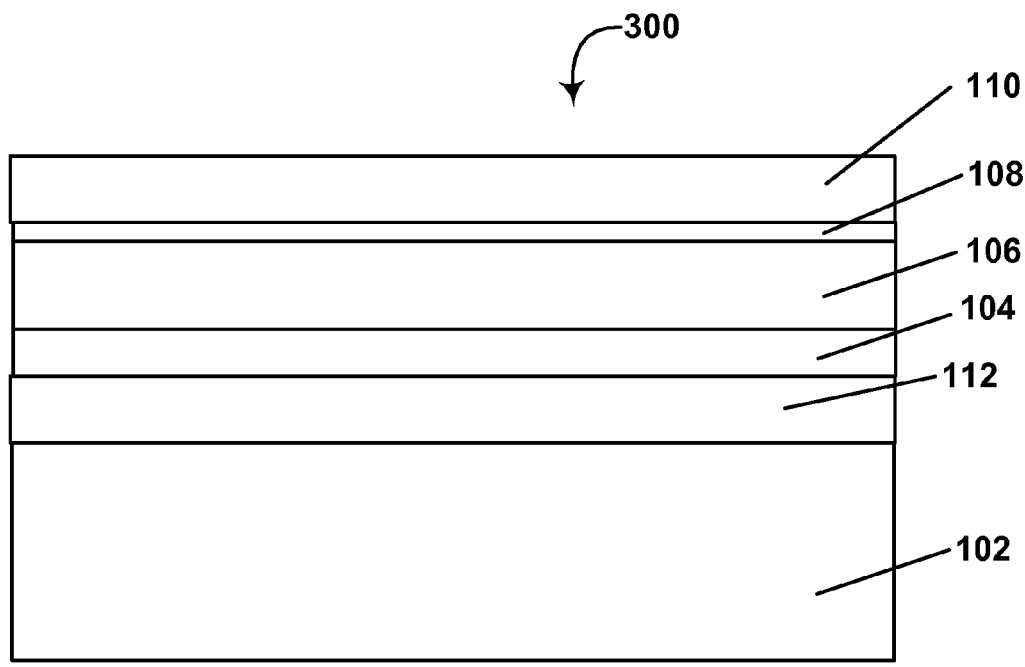
FIGS. 3 and 4 are schematic cross-sections, similar to those of FIGS. 1 and 2, through two different electrophoretic displays of the present invention in which the direct thermal imaging layer is positioned on the opposed side of the electrophoretic layer from the viewing surface of the display.

FIG. 3 illustrates a first rear color filter array display (generally designated 300) of the present invention. This display comprises the same layers as the display of FIG. 1, but the direct thermal imaging layer 112 is moved immediately adjacent the backplane 102, between the backplane 102 and the electrophoretic layer 106. A thin reflective layer (not shown) is provided between the direct thermal imaging layer 112 and the backplane 102.

Figure 4:
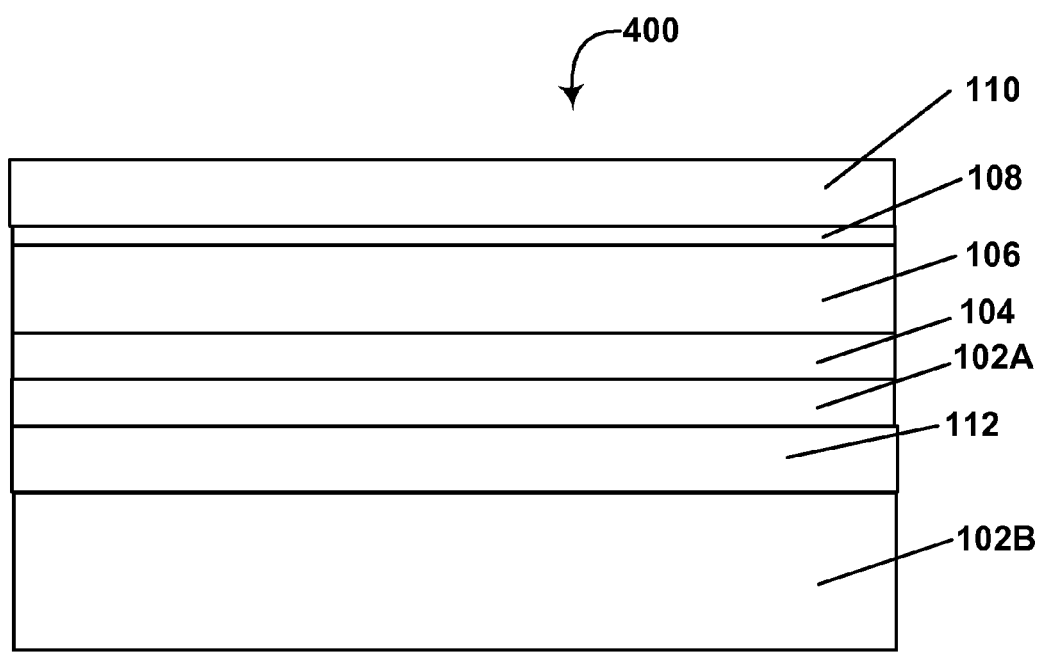

Finally, FIG. 4 illustrates a second rear color filter array display (generally designated 400) of the present invention, which differs from the display 300 shown in FIG. 3 with regard to the relative locations of the direct thermal imaging layer 112 and the backplane. In the display 400 shown in FIG. 4, the actual backplane 102A which carries the pixel electrodes (not shown) is relatively thin, and the direct thermal imaging layer 112 is disposed on the opposed side of this backplane 102A from the electrophoretic layer 106. Again, a thin reflective layer (not shown) is provided behind the direct thermal imaging layer 112 (i.e., on the lower surface of layer 112 as illustrated in FIG. 4) and a relatively thick substrate 102B supports the direct thermal imaging layer 112. In this form of display, the direct thermal imaging layer could be imaged while attached to the backplane 102A before the substrate 102B is attached to the direct thermal imaging layer.

In the process of the present invention, each individual display can be imaged to form a CFA aligned with the pixels of its backplane. Since the exact form of each color filter array can be controlled by the temperatures to which various areas of the direct thermal imaging layer are exposed during the imaging process, the spacing of the color filter elements and the colors thereof can be controlled by the software used to control the apparatus used for imaging. Thus, a single direct thermal imaging layer can be used to provide a wide variety of color filters on a wide variety of displays, and prototypes of any proposed display can readily and rapidly be produced. The resulting flexibility and ability to change CFA patterns and colors at low cost in the process of the present invention represents a very substantial advantage over prior art processes using photoresists and mask sets to make CFA's using conventional photolithography; the need to produce new mask sets for each model of display involves substantial time and expense. Furthermore, in the process of the present invention the formation of the CFA is effected after attachment of the front plane of the display to the backplane, so that, when both parts of the display are flexible, the present process enables one to avoid aligned lamination of one flexible sheet to another, a step which (as noted above) is inherently error-prone because of the possibility of the two sheets being in alignment in one part of the display and not in another. In the present process, the lamination of the two flexible sheets is effected while alignment is not necessary, and the imaging of the direct thermal imaging layer is controlled only by features of the backplane.

Numerous changes and modifications can be made in the preferred embodiments of the present invention already described without departing from the scope of the invention. Accordingly, the foregoing description is to be construed in an illustrative and not in a limitative sense.

The invention claimed is:

1. A process for producing an electro-optic display having a color filter array, which process comprises:
providing an electro-optic display comprising a direct thermal imaging layer and a backplane having a two-dimensional array of pixel electrodes wherein the direct thermal imaging layer comprises a plurality of layers of material, each layer capable of switching to a color; and
exposing the direct thermal imaging layer to temperatures sufficient to form a plurality of differently colored areas in the direct thermal imaging layer, the plurality of differently colored areas being aligned with the two-dimensional array of pixel electrodes.

2. A process according to claim 1 further comprising detecting at least one feature of the backplane and aligning the plurality of differently colored areas with respect to this feature of the backplane.

3. A process according to claim 2 wherein the detected feature is a fiducial mark on the backplane.

4. A process according to claim 2 wherein the detected feature is at least one row electrode and/or at least one column electrode.

5. A process according to claim 1 wherein the display further comprises a layer of a solid electro-optic material.

6. A process according to claim 5 wherein the electro-optic display has a viewing surface on the opposed side of the layer of electro-optic material from the backplane, and the direct thermal imaging layer is disposed between the layer of electro-optic material and the viewing surface.

7. A process according to claim 5 wherein the direct thermal imaging layer is disposed between the layer of electro-optic material and the backplane.

8. A process according to claim 7 wherein the plurality of differently colored areas are formed in the direct thermal imaging layer before the layer of electro-optic material is affixed to the direct thermal imaging layer.

9. A process according to claim 5 wherein the direct thermal imaging layer is disposed on the opposed side of the backplane from the layer of electro-optic material.

10. A process according to claim 9 wherein the plurality of differently colored areas are formed in the direct thermal imaging layer before the layer of electro-optic material is affixed to the direct thermal imaging layer.

11. A process according to claim 1 wherein the electro-optic material comprises a rotating bichromal member or electrochromic material.

12. A process according to claim 1 wherein the electro-optic material comprises an electrophoretic material comprising a plurality of electrically charged particles disposed in a fluid and capable of moving through the fluid under the influence of an electric field.

13. A process according to claim 12 wherein the electrically charged particles and the fluid are confined within a plurality of capsules or microcells.

14. A process according to claim 12 wherein the electrically charged particles and the fluid are present as a plurality of discrete droplets surrounded by a continuous phase comprising a polymeric material.

15. A process according to claim 12 wherein the fluid is gaseous.

16. An electro-optic display comprising:
a layer of a solid electro-optic material;
a backplane having a two-dimensional array of pixel electrodes arranged to apply an electric field to the electro-optic layer; and
a direct thermal imaging layer capable, upon exposure to elevated temperatures, of forming areas having at least two differing colors wherein the direct thermal imaging layer comprises a plurality of layers of material, each layer capable of switching to a color upon application of sufficient temperatures.

17. An electro-optic display according to claim 16 wherein the electro-optic display has a viewing surface on the opposed side of the layer of electro-optic material from the backplane, and the direct thermal imaging layer is disposed between the layer of electro-optic material and the viewing surface.

18. An electro-optic display according to claim 16 wherein the direct thermal imaging layer is disposed between the layer of electro-optic material and the backplane.

19. An electro-optic display according to claim 16 wherein the direct thermal imaging layer is disposed on the opposed side of the backplane from the layer of electro-optic material.

20. A front plane laminate comprising a direct thermal imaging layer comprising a plurality of layers of material, and capable, upon exposure to elevated temperatures, of forming areas having at least two differing colors, an electrically-conductive layer, an electro-optic layer and an adhesive layer disposed on the opposed side of the electro-optic layer from the electrically-conductive layer.

21. A front plane laminate according to claim 20 further comprising a release sheet covering the surface of the adhesive layer remote from the electro-optic layer.

22. A component useful for the production of an electro-optic display, the component comprising a layer of a solid electro-optic material, and a direct thermal imaging layer comprising a plurality of layers of material, and capable, upon exposure to elevated temperatures, of forming areas having at least two differing colors, the direct thermal imaging layer being affixed to the layer of solid electro-optic material.

\* \* \* \* \*